3,332,915
ACCELERATORS FOR THE VULCANIZATION OF RUBBER

James Stephen Corrigall, Greenwich, Conn., assignor to R. T. Vanderbilt Company, Inc., New York, N.Y., a corporation of New York
No Drawing. Filed Jan. 13, 1965, Ser. No. 425,336
8 Claims. (Cl. 260—79.5)

This invention is concerned with accelerators for the vulcanization of rubber.

It is an object of the invention to provide a novel and useful class of rubber accelerators. Another object is to provide vulcanizates having distinctive and useful properties, such as good aging.

It has now been discovered that 1,10-phenanthroline

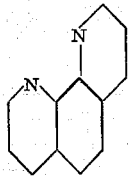

and 2,2'-bipyridine

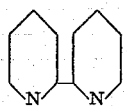

which are known compounds, accelerate the sulfur vulcanization of the diene rubbers when used in small but effective amounts that produce the desired accelerating effect. Such amounts are generally within the range 0.1 to 5.0%.

Such rubbers are generally sulfur-vulcanizable conjugated diene homopolymer and copolymer rubbers. They include natural rubber and synthetic polyisoprene (Natsyn) and also include polybutadiene. They include the copolymers of conjugated dienes with ethylenically unsaturated monomers copolymerizable therewith such as butadiene-styrene copolymer rubber (SBR), butadiene-acrylonitrile rubber (nitrile rubber), isobutylene-isoprene copolymer rubber (butyl), and ethylene-propylene-diene-monomer rubber (EPT-3509). They include as well butadiene-acrylate and butadiene-methacrylate copolymer rubbers. The diene monomer of the ethylene-propylene-diene-monomer rubber (otherwise known as EPDM terpolymer rubber) may be cylopentadiene which has a conjugated double bond linkage as desired in accordance with the present invention. The butyl rubber is of the type described in United States Patent No. 2,356,128.

The accelerators of the invention were tested in standard formulations of several representative types of rubbers, and were found to have useful accelerating activity in the sulfur-vulcanizable diene rubbers. The following examples are intended to illustrate but not to limit the scope of the invention.

Example 1

The accelerators of the invention were compounded at several concentrations with separate portions of a natural rubber base stock formulated from:

| Component: | Parts by weight |
|---|---|
| Natural rubber | 100 |
| Stearic acid | 2 |
| Zinc oxide | 5 |
| Octylated diphenylamine | 1 |
| FT carbon black | 75 |
| Sulfur | 2.5 |

The compounds formed by mixing the accelerators with the base stock as shown below were cured by heating in a press at 290° F. for 20 minutes, and physical constants (modulus, tensile strength, elongation, hardness and Mooney sorch) of the vulcanizates were determined by standard methods. The results of the tests are summarized below.

| Compound | 1 | 2 | 3 | 4 | 5 | 6 | 7 |
|---|---|---|---|---|---|---|---|
| Accelerators, in phr.: | | | | | | | |
| 1,10-phenanthroline | | 0.3 | 0.5 | 1.0 | | | |
| 2,2'-bipyridine | | | | | 0.3 | 0.5 | 1.0 |
| Press cured at 290° F. for 20 minutes: | | | | | | | |
| Modulus (p.s.i. at 300% elongation) | 100 | 500 | 630 | 900 | 480 | 530 | 620 |
| Tensile, p.s.i. | 830 | 2,600 | 2,540 | 2,840 | 2,590 | 2,710 | 2,880 |
| Elongation, percent at break) | 800 | 660 | 620 | 590 | 670 | 670 | 660 |
| Hardness (Shore) | 32 | 47 | 50 | 59 | 46 | 48 | 52 |
| Mooney scorch at 270° F. (large rotor): | | | | | | | |
| Time to 5-pt. rise, min | 16 | 2 | 2 | 1 | 3 | 2 | 2 |
| Total time, min | 24 | 4.5 | 4 | 2 | 6 | 4.5 | 3.5 |

These data show that both 1,10-phenanthroline and 2,2'-bipyridine have a marked accelerating effect in the test compound, the activity increasing with increasing concentration of accelerator.

Example 2

The effect of litharge as an activator for 1,10-phenanthroline was determined in a heavily carbon-loaded natural rubber base stock formulated from:

| Component: | Parts by weight |
|---|---|
| Natural rubber | 100 |
| Stearic acid | 2 |
| FT carbon black | 75 |
| Sulfur | 2.5 |

To separate portions of the stock formulation were added litharge or zince oxide in varying amounts, keeping 1,10-phenanthroline constant at 0.3 phr. These compounds were press cured at 290° F. for 20 minutes, and the physical properties of the vculcanizates were determined.

| Compound | 1 | 2 | 3 | 4 | 5 | 6 |
|---|---|---|---|---|---|---|
| Accelerator, in phr.: 1,10-phenanthroline | 0.3 | 0.3 | 0.3 | 0.3 | 0.3 | 0.3 |
| Activator, in phr.: | | | | | | |
| Zinc oxide | 5 | 10 | 20 | | | |
| Litharge | | | | 5 | 10 | 20 |
| Press cured at 290° F. for 20 minutes: | | | | | | |
| Modulus | 490 | 490 | 560 | 570 | 640 | 610 |
| Tensile, p.s.i | 2,410 | 2,240 | 2,210 | 2,680 | 2,630 | 2,340 |
| Elongation, percent | 650 | 630 | 620 | 650 | 630 | 600 |
| Hardness | 47 | 47 | 48 | 49 | 51 | 50 |
| Mooney scorch at 250° F. (large rotor): | | | | | | |
| Time to 5-pt. rise, min | 6 | 5 | 5.5 | 2 | 2 | 2 |
| Total time, min | 10 | 9.5 | 9.5 | 3 | 3 | 3.5 |

These data show that litharge has a better activating effect (faster cure) upon 1,10-phenanthroline than does zinc oxide, but results in scorchier compounds. Though tensile values are similar, higher modulus and higher hardness indicate that cure is faster. There is little advantage in increasing either zinc oxide or litharge beyond 10 phr.

*Example 3*

The effect of different concentrations of the accelerators of the invention upon sulfur vulcanization of butadiene-styrene copolymer rubber was determined, using a stock formulation containing:

| Component: | Parts by weight |
|---|---|
| SBR 1500 | 100 |
| Stearic acid | 2 |
| Zinc oxide | 5 |
| HAF carbon black | 35 |
| MT carbon black | 25 |
| Octylated diphenylamine | 1 |
| Sulfur | 2 |

Separate portions of the base formulation were compounded with the accelerators as shown below, press cured at 307° F. for 45 minutes, then the physical constants of the vulcanizates were determined. The results of these tests are summarized as follows.

| Compound | 1 | 2 | 3 | 4 | 5 | 6 | 7 |
|---|---|---|---|---|---|---|---|
| Accelerators, in phr.: | | | | | | | |
| 1,10-phenanthroline | | 0.35 | 0.6 | 1.0 | | | |
| 2,2'-bipyridine | | | | | 0.35 | 0.6 | 0.1 |
| Press cured at 307° F. for 45 minutes: | | | | | | | |
| Modulus | 110 | 210 | 420 | 1,000 | 290 | 640 | 1,050 |
| Tensile, p.s.i | 110 | 690 | 1,420 | 1,860 | 1,190 | 2,200 | 2,680 |
| Elongation, percent | 850 | 950 | 750 | 520 | 960 | 810 | 650 |
| Hardness | 42 | 48 | 53 | 59 | 52 | 56 | 61 |
| Mooney scorch at 270° F.: | | | | | | | |
| Time to 5-pt. rise, min | >120 | 62 | 42 | 25 | 33.5 | 35 | 15 |
| Total time, min | | 85 | 58 | 37 | 62 | 52 | 27 |

The data show that both of the accelerators of the invention possess some accelerating activity in SBR copolymer rubber in direct proportion to the quantities of accelerator used, and that the activity is not as high as in natural rubber. 2,2'-bipyridine appears to be more active than 1,10-phenanthroline.

*Example 4*

The accelerators of the invention were incorporated at several different concentrations in the following base formulation of Natsyn brand polyisoprene, a synthetic rubber of Goodyear Rubber Company.

| Component: | Parts by weight |
|---|---|
| Natsyn 200 | 100 |
| Stearic acid | 2 |
| Zinc oxide | 5 |
| Reogen brand plasticizer* | 2 |
| HAF carbon black | 25 |
| MT carbon black | 35 |
| Octylated diphenylamine | 1 |
| Sulfur | 2.5 |

* Mixture of oil soluble sulfonic acid of high molecular weight with a paraffin oil.

Portions of the base formulation accelerated in various ways were press cured at 290° F. for 40 minutes and the physical constants of the vulcanizates were determined with the following results.

| Compound | 1 | 2 | 3 | 4 | 5 | 6 | 7 |
|---|---|---|---|---|---|---|---|
| Accelerators, in phr.: | | | | | | | |
| 1,10-phenanthroline | | 0.25 | 0.5 | 1.0 | | | |
| 2,2'-bipyridine | | | | | 0.25 | 0.5 | 1.0 |
| Press cured at 290° F. for 40 minutes: | | | | | | | |
| Modulus | 380 | 940 | 1,250 | 1,640 | 900 | 1,170 | 1,350 |
| Tensile, p.s.i | 1,490 | 2,870 | 3,220 | 3,180 | 2,870 | 3,190 | 3,270 |
| Elongation, percent | 590 | 600 | 570 | 510 | 600 | 600 | 560 |
| Hardness | 37 | 49 | 55 | 60 | 49 | 52 | 54 |
| Mooney scorch at 270° F. (large rotor): | | | | | | | |
| Time to 5-pt. rise, min | 9 | 3 | 1.5 | 1.5 | 3.5 | 2.5 | 1.5 |
| Total time, min | 16.5 | 7.5 | 4.5 | 3.5 | 7.5 | 5.5 | 3.5 |

These data show decided accelerator activity of both the compounds of the invention, increasing with higher concentrations of the accelerators. 1,10-phenanthroline produces higher modulus and hardness than 2,2'-bipyridine used at equal concentrations.

Example 5

The effect of the accelerators of the invention was tested in an ethylene-propylene-unsaturated monomer (cyclopentadiene) terpolymer rubber, EPT-3509 of Enjay Chemical Corporation, by using varying amounts of the accelerators in the following stock formulation:

| Component: | Parts by weight |
|---|---|
| EPT-3509 terpolymer rubber | 100 |
| Stearic acid | 1 |
| Zinc oxide | 5 |
| Agerite Resin D [1] antioxidant | 1 |
| HAF carbon black | 75 |
| MT carbon black | 50 |
| Flexon 580 [2] processing oil | 50 |
| Sulfur | 1.5 |

[1] Polymerized 2,2,4-trimethyl-1,2-dihydroquinoline.
[2] Naphthenic oil of about 50% aromatics content of Humble Oil & Refining Co.

The accelerators were milled into separate portions of the stock formulation, and the compounds thus formed were press cured at 345° F. for 20 minutes. Physical constants of the vulcanizates were determined and are summarized below.

| Compound | 1 | 2 | 3 |
|---|---|---|---|
| Accelerators, in phr.: | | | |
| 1,10-phenanthroline | | 1.0 | |
| 2,2'-bipyridine | | | 1.0 |
| Press cured at 345°F. for 20 minutes: | | | |
| Modulus | 130 | 230 | 200 |
| Tensile, p.s.i. | 250 | 1,070 | 890 |
| Elongation, percent | 820 | 850 | 830 |
| Hardness | 51 | 58 | 56 |
| Mooney scorch at 270°F. (large rotor): | | | |
| Time to 5-pt. rise, min | 51.5 | 33.5 | 31.5 |
| Total time, min | 61.5 | 41.5 | 40 |

These data show that 1,10-phenanthroline and 2,2'-bipyridine are accelerators for ethylene-propylene terpolymer rubber.

Example 6

The accelerators of the invention were added in varying quantities to the stock composition of Example 1 which was modified by replacing the 2.5 phr. of sulfur by different amounts of tetramethylthiuram disulfide. The compounds were press cured at 290° F. for five minutes. Physical constants of the vulcanizates were determined. Mooney scorch was determined on the unvulcanized compounds. Results obtained are given below.

| Compound | 1 | 2 | 3 | 4 | 5 |
|---|---|---|---|---|---|
| Accelerators, in phr.: | | | | | |
| Tetramethylthiuram disulfide | 2.0 | 2.0 | 2.0 | 2.0 | 2.0 |
| 1,10-phenanthroline | 0 | 0.5 | 1.0 | 0 | 0 |
| 2,2'-bipyridine | 0 | 0 | 0 | 0.5 | 1.0 |
| Press cured at 290°F. for 5 minutes | | | | | |
| Modulus | 230 | 280 | 280 | 300 | 280 |
| Tensile, p.s.i. | 1,790 | 1,930 | 2,070 | 2,090 | 2,000 |
| Elongation, percent | 690 | 670 | 740 | 720 | 720 |
| Hardness | 40 | 41 | 47 | 40 | 43 |
| Mooney scorch at 250°F.: | | | | | |
| Time to 5-pt. rise, min | 3.5 | 4 | 4 | 3.5 | 3.5 |
| Total time, min | 10.5 | 9.5 | 10 | 8 | 8.5 |

The data show that both 1,10-phenanthroline and 2,2'-bipyridine activate the cure by tetramethylthiuram disulfide.

Example 7

To the natural rubber stock formulation of Example 1 was added an accelerator system composed of 1 phr. of N-oxydiethylene benzothiazole-2-sulfenamide and 0.1 or 0.2 phr. of one of the accelerators of the invention. The control contained N-oxydiethylene benzothiazole-2-sulfenamide alone. The compounds were press cured at 290° F. Physical constants of compounds cured five minutes are summarized below, as well as Mooney scorch values for uncured compounds.

| Compound | 1 | 2 | 3 | 4 | 5 |
|---|---|---|---|---|---|
| Accelerators, in phr.: | | | | | |
| N-oxydiethylene benzothiazole-2-sulfenamide | 1.0 | 1.0 | 1.0 | 1.0 | 1.0 |
| 1,10-phenthroline | 0 | 0.1 | 0.2 | 0 | 0 |
| 2,2'-bipyridine | 0 | 0 | 0 | 0.1 | 0.2 |
| Press cured at 290° F. for 5 min: | | | | | |
| Modulus | 110 | 450 | 620 | 490 | 580 |
| Tensile, p.s.i. | 680 | 2,740 | 2,860 | 2,700 | 3,020 |
| Elongation, percent | 680 | 670 | 640 | 680 | 660 |
| Hardness | 30 | 42 | 52 | 46 | 50 |
| Mooney scorch at 250° F.: | | | | | |
| Time to 5-pt. rise, min | 15 | 11 | 7 | 11 | 8 |
| Total time, min | 30 | 21 | 13.5 | 21 | 15 |

These data show that both, 1,10-phenanthroline and 2,2'-bipyridine activate N-oxydiethylene benzothiazole-2-sulfenamide at both processing and curing temperatures.

Example 8

A butyl rubber stock was prepared from Enjay Chemical Company's Butyl 325, an isobutylene-isoprene copolymer having higher unsaturation than some copolymers, 2.1-2.5% (2.1-2.5 diolefin (isoprene) units per 100 monomer units in the polymer chain). The stock was as follows:

| Component: | Parts by weight |
|---|---|
| Butyl 325 | 100 |
| Stearic acid | 1 |
| Zinc oxide | 5 |
| Plastogen | 3 |
| Dioctylated diphenylamine | 1 |
| MT carbon black | 25 |
| FEF carbon black | 35 |
| Sulfur | 2 |
| Accelerator (see below). | |

To separate portions of this stock were added varying quantities of the accelerators of the invention. One portion was left unaccelerated. The compounds were press cured at 320° F. for fifteen minutes and the physical properties of the vulcanizates were determined.

| Compound | 1 | 2 | 3 |
|---|---|---|---|
| Accelerators, in phr.: | | | |
| 1,10-phenanthroline | 0 | 2.0 | 0 |
| 2,2'-bipyridine | 0 | 0 | 2.0 |
| Press cured at 320° F. for 15 minutes: | | | |
| Modulus | 110 | 260 | 270 |
| Tensile, p.s.i. | 520 | 1,500 | 1,570 |
| Elongation, percent | 1,160 | 830 | 810 |
| Hardness | 32 | 44 | 41 |
| Mooney scorch at 250° F.: | | | |
| Time to 5-pt. rise, min | | 14.5 | 8.5 |
| Total time, min | >90 | 33.5 | 42 |

Both accelerators are effective for butyl rubber.

Example 9

A nitrile rubber, Hycar 1042 of B. F. Goodrich Company described as low temperature polymerized, medium high acrylonitrile butadiene-acrylonitrile copolymer, was formulated as follows:

| Component: | Parts by weight |
|---|---|
| Hycar 1042 | 100 |
| Stearic acid | 1 |
| Zinc oxide | 5 |
| Dioctylated diphenylamine | 1 |
| FT carbon black | 75 |
| FEF carbon black | 30 |
| Dioctyl phthalate | 20 |
| Sulfur | 1.5 |

Separate portions of this stock were mixed with various accelerators and one was left unaccelerated as a control.

The compounds were press cured at 312° F. for 20 minutes and the physical constants of the vulcanizates determined.

| Compound | 1 | 2 | 3 | 4 | 5 |
|---|---|---|---|---|---|
| Accelerators, in phr.: | | | | | |
| 1,10-phenanthroline | 0 | 0.4 | 1.0 | 0 | 0 |
| 2,2'-bipyridine | 0 | 0 | 0 | 0.4 | 1.0 |
| Press cured at 312° F. for 20 minutes: | | | | | |
| Modulus | Uncured | 390 | 670 | 340 | 510 |
| Tensile, p.s.i. | | 1,570 | 1,820 | 1,420 | 1,730 |
| Elongation, percent | | 690 | 570 | 730 | 650 |
| Hardness | | 53 | 56 | 50 | 52 |
| Mooney scorch at 250° F.: | | | | | |
| Time to 5-pt. rise, min | | 29 | 6 | 31 | 11 |
| Total time, min | >90 | 43 | 11 | 47.5 | 19 |

These data show that both of the experimental materials accelerate the vulcanization of nitrile rubber, the 1,10-phenanthroline being more active than 2,2'-bipyridine.

It is evident from the foregoing that the compositions of the invention may include the usual sulfur-containing vulcanizing agents (including sulfur) such as tetramethylthiuram disulfide, dipentamethylenethiuram tetrasulfide and morpholine disulfide, as well as pigments, dyes, plasticizers, fillers, extenders, antiozonants and antioxidants and in the amounts customarily used in the prior art.

I claim:

1. A composition of matter comprising a sulfur-vulcanizable diene rubber, a sulfur-producing vulcanizing agent, and an accelerator of the class consisting of 1,10-phenanthroline and 2,2'-bipyridine in an amount in the approximate range 0.1 to 5 parts per hundred parts of rubber.

2. The composition described in claim 1 in which the diene rubber is natural rubber.

3. The composition described in claim 1 in which the diene rubber is butadiene-styrene copolymer rubber.

4. The composition described in claim 1 in which the diene rubber is polyisoprene.

5. The composition described in claim 1 in which the diene rubber is ethylene-propylene-diene monomer rubber.

6. The composition described in claim 1 in which the diene rubber is isobutylene-isoprene copolymer rubber.

7. The composition described in claim 1 in which the diene rubber is butadiene-acrylonitrile copolymer.

8. The process of vulcanizing sulfur-vulcanizable diene rubber composed of a major proportion of diene hydrocarbon which comprises heating at vulcanizing temperature said rubber having incorporated therein a sulfur-containing vulcanizing agent and an accelerating amount of an accelerator of the group consisting of 1,10-phenanthroline and 2,2'-bipyridine, the amount being in the approximate range 0.1 to 5 parts per hundred parts of rubber.

No references cited.

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,332,915                                                   July 25, 1967

James Stephen Corrigall

It is hereby certified that error appears in the above numbered patent requiring correction and that the said Letters Patent should read as corrected below.

Column 1, line 66, for "cylopentadiene" read -- cyclopentadiene --; column 2, line 28, for "sorch" read -- scorch --; line 40, for "at break)" read -- (at break) --; line 64, for "zince" read -- zinc --; line 68, for "vculcanizates" read -- vulcanizates --; columns 3 and 4, in the last table, eighth column, line 2 thereof, for "0.1" read -- 1.0 --; column 5, in the second table, first column, line 1 thereof, for "Ascelerators" read -- Accelerators --.

Signed and sealed this 18th day of June 1968.

(SEAL)
Attest:

Edward M. Fletcher, Jr.                                      EDWARD J. BRENNER
Attesting Officer                                                 Commissioner of Patents